Dec. 5, 1944.  L. F. SAYLES ET AL  2,364,477
ADJUSTABLE SUPPORTING BRACKET
Filed May 24, 1943
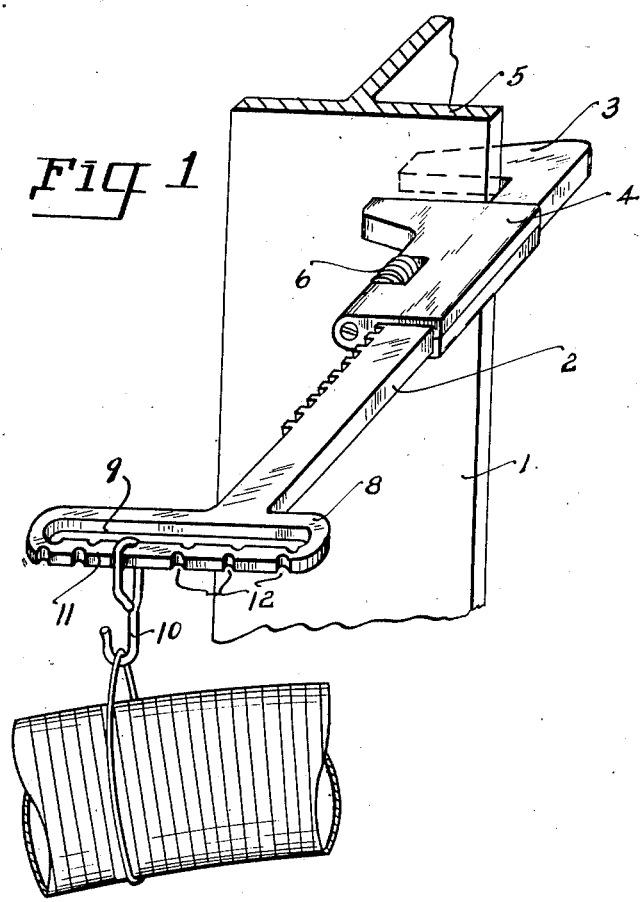
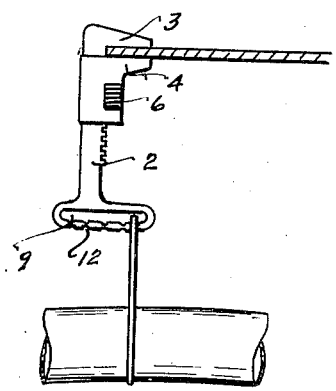
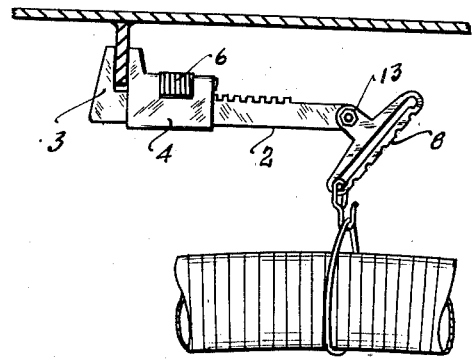
LOUIS F. SAYLES
JAMES NORMAN SAYLES
INVENTORS
BY Patented Dec. 5, 1944

2,364,477

UNITED STATES PATENT OFFICE 2,364,477

ADJUSTABLE SUPPORTING BRACKET

Louis F. Sayles and James Norman Sayles, Portland, Oreg.

Application May 24, 1943, Serial No. 488,230

2 Claims. (Cl. 248—205)

This invention relates to supporting brackets to be used in construction work where the bracket is attached to the beams or girders under construction for supporting objects, such as air lines, ventilating tubes, electric light wires, welding equipment and so forth.

The primary object of the invention is to provide a supporting bracket that may be adjusted to any dimension or type of support.

A further object of the invention is to provide a method of supporting the load that will exert the greatest amount of gripping or binding action to the device relative to its support.

A still further object of the invention is to provide a unit that has an adjustment for re-distributing the load carried thereby for increasing its gripping action.

These and other incidental objects will be apparent in the drawing, specification and claims.

Referring to the drawing:

Figure 1 illustrates our new and improved adjustable supporting bracket applied to a construction beam and supporting a typical load thereon.

Figure 2 illustrates still another application of our new and improved supporting bracket.

Figure 3 illustrates our new and improved supporting bracket attached to a horizontal beam, illustrating the method of application.

In the drawing:

1 illustrates a vertical supporting beam having our new and improved supporting bracket 2 applied thereto. The bracket has an integral jaw 3 and a movable and adjustable jaw 4 for gripping the flange 5 of the girder 1. A suitable adjusting nut 6 is journaled within the movable jaw 4 and cooperates with the threaded portion of the bracket for adjusting and spacing the jaws 3 and 4 apart and gripping the flange 4 of the girder 1.

Our invention consists of providing a cross yoke 8 on the opposite end of the supporting bracket 2. The yoke consists of a slot 9, through which the supporting hook 10 is looped. The outward portion 11 of the yoke 8 has notches 12 for positioning the supporting hook 10 and maintaining the hook in a predetermined location relative to the holding bracket 2. The object and purpose of an adjustable supporting hook arrangement is to adjust the weight relative to the holding bracket so that the jaws 3 and 4 will most effectively grip the supporting beam.

The position of the hook 10 may be changed by moving it relative to the notched bar 11 so that other notches may be selected, depending on the desired position of the hook relative to the application of the holding bracket to the supporting beam. The yoke 8 may be pivotally mounted at 13 to the holding bracket 2 and may be locked in any desired position providing a further adjustment of the load relative to the holding bracket.

By the provision of the lateral adjusting yoke, the holding bracket may be applied in any position to a supporting member, and a binding and gripping action may be applied thereto by the load supported thereby. This is the primary object of this invention, the provision of an adjustable bracket and means within the bracket for exerting the greatest amount of frictional gripping effect to the object to which the bracket is attached. It will be noted that the adjustable jaw 4 is of sleeve-like form, slidably embracing the supporting bracket 2, and is of appreciable length, to thereby continuously apply an appreciable weight to the support to compel sufficient tilting thereof to prevent casual separation of the bracket from the element to which it is connected in the absence of weight on the yoke 8.

We do not wish to be limited to the exact construction herein illustrated, as other forms of mechanical embodiment may be employed still coming within the scope of our claims.

What is claimed as new is:

1. A supporting bracket having a shank formed at one end with a jaw, a cooperating jaw having sliding movement on the shank and including a sleeve-like portion slidable on the shank and extending forwardly of the jaws to exert a weight-influence on the gripping action of the jaws, means for relatively adjusting the jaws, and an article supporting yoke carried by the end of the shank remote from the jaws, said yoke having a length materially greater than the width of the shank.

2. A construction as claimed in claim 1, wherein the yoke is swingingly connected to the shank for selective positioning under connected article weight.

LOUIS F. SAYLES.
JAMES NORMAN SAYLES.